Patented Dec. 17, 1946

2,412,922

UNITED STATES PATENT OFFICE 2,412,922

SULPHUR DYESTUFFS

Norbert Steiger, Lock Haven, Pa., assignor to American Aniline Products, Inc., New York, N. Y., a corporation of New York No Drawing. Application February 8, 1944, Serial No. 521,571

6 Claims. (Cl. 260—128)

This invention relates to the production of new brown sulphur dyestuffs of good solubility which dye cotton and other vegetable fibers and which have remarkable properties of fastness to washing, chlorine and more especially to light.

The new dyestuffs are made by the sulphurization of 5 phenyl 1.3.4.trichloro-phenthiazone-2, a new product which corresponds to the following formula:

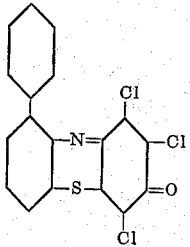

The objects of the invention are attained in general by thionating this thiazone in aqueous, aqueous alcoholic or alcoholic media or by a process of baking with an alkali metal polysulphide. The resulting dye may then be separated from the sulphurization medium by methods known to the art.

The new product 5 phenyl 1.3.4.trichloro-phenthiazone-2 may be prepared by condensing 2 amino 3 mercapto diphenyl in the form of the zinc mercaptide corresponding to the following formula:

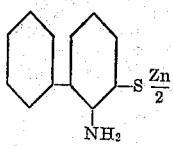

The condensation is effected with chloranil in alcohol.

2 amino 3 mercapto diphenyl can be obtained by a caustic fusion of 2 amino 4 phenyl benzothiazole which is prepared in good yield from 2 amino diphenyl thio urea by treatment with halogens or acid halides in any one of the many ways given in the chemical literature for the preparation of 2 amino aryl thiazoles. (See Organic Synthesis, vol. 22, p. 16; Hunter, Journal Chemical Society, 1926, p. 1399; Friedlaender, Fortschritte der Teerfarben Fabrikation, Berlin (Julius Springer 1932), vol. 17, page 613—D. R. P. 537,105; vol. 21, Berlin (1937), page 227—D. R. P. 604,639.)

The invention will be more clearly understood by reference to the following examples which are given merely as illustrations of the method and not as limitations on the invention. The parts are by weight.

Example 1

36 parts Cellosolve (ethylene glycol monoethyl ether), 290 parts water, 45 parts sodium sulphide conc., 31 parts sulphur, are heated to solution in a stainless steel kettle provided with an agitator and reflux condenser, thus producing a polysulphide of approximate formula $Na_2S_{3.6}$. Then are added at 60 degrees C. 20 parts 5 phenyl 1.3.4.trichloro-phenthiazone. The temperature of the mass is increased within four hours to the boil, then kept refluxing 36 to 48 hours. The melt is then diluted with 2500 parts of water, 20 parts soda ash are added and aerated at 50 to 60 degrees C. The dyestuff is filtered, the filter cake sludged with 1000 parts water acidified with hydrochloric acid, filtered and the cake washed acid-free with water and dried. The dyestuff is, when ground, a brown powder which is easily soluble in diluted sodium sulphide solution. From this solution cotton is dyed in bright, reddish brown shades of excellent fastness to washing, good fastness to chlorine, and very good light fastness.

The Cellosolve can be replaced as well by glycerine, ethylene glycol, diethylene glycol, etc. The melt can also be carried out in water alone, but in this case the melting time has to be extended appropriately.

Example 2

A solution is made up of 48 parts sodium sulphide conc., 38 parts sulphur in 150 parts water.

Then are added 150 parts alcohol and 30 parts of 5 phenyl 1.3.4.trichloro-phenthiazone and heated to reflux for 45 hours. Then the melt is diluted to a volume of 1500 parts, 15 parts soda ash are added and aerated at 50 degrees. It is filtered and the cake washed with water and dried. The obtained dyestuff is readily soluble in diluted aqueous sodium sulphide solution and dyes full brown shades on cotton, which are not quite as bright but are more yellowish than those dyeings obtained with the dyestuff from Example 1.

*Example 3*

A stainless steel kettle, equipped with agitator and reflux condenser, is charged with 200 parts normal butanol, 96 parts sodium sulphide, 66 parts sulphur and boiled for ½ to 1 hour. It is then cooled down to 90 degrees and 50 parts 5 phenyl 1.3.4.trichloro-phenthiazone are added and refluxed for 36 hours. The butanol is steam distilled off, the dyestuff is salted out, filtered, and the filter cake washed with salt water. The excess sulphur can be removed in the usual manner, e. g., by extraction with an aqueous solution of sodium sulphite. The ground, dry dyestuff is a dark brown powder. It dyes the vegetable fibers from a sodium sulphide bath, a bright reddish brown of excellent fastness, somewhat bluer in shade than the dyestuff of Example 1. Similar dyes are obtained by using higher polysulphides, e. g., Na₂S₅ or Na₂S₇.

*Example 4*

20 parts sodium sulphide cryst., 10 parts water, 25 parts sulphur and 10 parts 5 phenyl 1.3.4.trichloro-phenthiazone are intimately mixed and dried in vacuum. The mixture is then baked at 185 to 200 degrees C., until the H₂S evolution has ceased. The melt is pulverized and dissolved by heating with a sodium sulphide solution. The dyestuff is then isolated by aeration. It dyes cotton from the sodium sulphide bath in full brown shades of very good fastness.

*Example 5*

A stainless steel kettle is charged with 200 parts alcohol, 31 parts sulphur, 21 parts sodium sulphide and refluxed 1 hour. Then are added 18 parts 5 phenyl 1.2.4.trichloro-phenthiazone and the whole refluxed for 60 to 72 hours. After this time, 15 parts sodium sulphide, 300 parts water, 1 part of Filter-Cel are added and the solution filtered at 80 degrees C. 10 parts soda ash are added to the filtrate and aerated. The dyestuff is then filtered and dried. It is, when ground, a dark brown powder, easily soluble in sodium sulphide and dyes the vegetable fibers a bright reddish brown of excellent fastness.

*Example 6*

The thionating stainless steel vessel is charged with 30 parts Cellosolve, 70 parts water, 46 parts sodium hydroxide, 92 parts sulphur, and heated under reflux to solution. Then are added 20 parts 5 phenyl 1.3.4.trichloro-phenthiazone and refluxed 48 hours. The temperature of the melt is about 108 degrees C. The melt is diluted with a solution of 20 parts sodium sulphide in 300 parts water, refluxed 1 hour and filtered. The dyestuff is isolated by aeration of the filtrate. The dye yields, when dyed from the sodium sulphide bath, a bright, reddish brown on cotton.

Having thus described my invention, what I claim is:

1. A sulphur dye resulting from the thionation of 5 phenyl 1.3.4.trichlorophenthiazone 2 corresponding to the following formula:

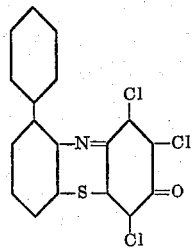

by acting with an alkali metal polysulphide on said compound at the boil; said dye being a water insoluble thionated compound which is soluble in dilute aqueous sodium sulphide solution and which dyes vegetable fibers from an aqueous sodium sulphide solution in shades that develop in air to a brown.

2. As a sulphur dye intermediate the 5 phenyl 1.3.4.trichlorophenthiazone 2 represented by the following formula:

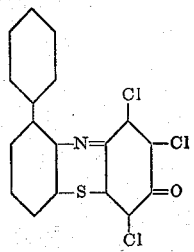

3. The process which comprises thionating in a thionating medium a compound represented by the formula:

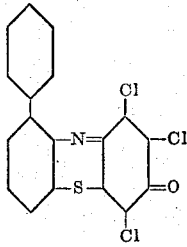

said thionating medium being one of the group consisting of water, alcohols, higher alcohols and aqueous alcoholic mixtures and a polysulphide represented by the formula Na₂S$_x$, wherein $x$ is at least 3; heating in said medium until the compound is thionated and then precipitating the thionated product.

4. The process which comprises thionating in a thionating medium a compound represented by the formula:

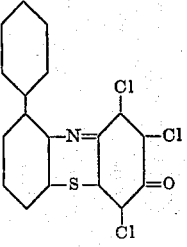

said thionating medium consisting of higher alcohols and a polysulphide represented by the formula Na₂S$_x$, wherein $x$ is at least 3; heating in said medium until said compound is thionated and then distilling off the solvent in vacuum, steaming the residue and salting out the dye from the residue.

5. The process which comprises the thionation of a compound represented by the formula:

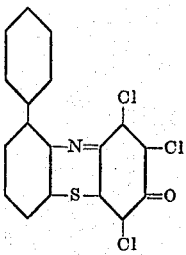

in a medium consisting of a polysulphide represented by the formula Na$_2$S$_x$, wherein $x$ is at least 4; baking said mixture in said medium at a temperature range of 150–230° until the compound is thionated; dissolving the thionated product in sodium sulphide and water and subsequently precipitating the dye by aeration.

6. Brown sulphur dyestuffs obtained by forming a solution of sodium sulphide, sulphur and water, and adding thereto alcohol and 5 phenyl 1.3.4.trichlorophenthiazone corresponding to the formula:

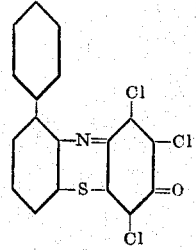

refluxing at the boil for from 36 to 48 hours, diluting the melt with water, and isolating the dyestuff in the usual manner.

NORBERT STEIGER.